United States Patent [19]

Tanoi

[11] Patent Number: 5,751,665
[45] Date of Patent: May 12, 1998

[54] CLOCK DISTRIBUTING CIRCUIT

[75] Inventor: Satoru Tanoi, Tokyo, Japan

[73] Assignee: Oki Electric Industry Co., Ltd., Tokyo, Japan

[21] Appl. No.: 678,860

[22] Filed: Jul. 21, 1996

[30] Foreign Application Priority Data

Jul. 14, 1995 [JP] Japan ................. 7-179081

[51] Int. Cl.$^6$ ............... G04F 8/00; H03K 5/13; H03K 5/00
[52] U.S. Cl. ............... 368/120; 327/147; 327/149; 327/161; 327/295
[58] Field of Search ............... 368/10, 120, 155, 368/156; 326/101; 327/141, 144–150, 152–161, 295, 297; 331/46, 49, 55, 61

[56] References Cited

U.S. PATENT DOCUMENTS

| | | | |
|---|---|---|---|
| 5,087,829 | 2/1992 | Ishibashi et al. | 307/269 |
| 5,184,027 | 2/1993 | Masuda et al. | 307/269 |
| 5,278,457 | 1/1994 | Fujita et al. | 307/269 |
| 5,298,866 | 3/1994 | Kaplinsfy | 328/155 |
| 5,430,397 | 7/1995 | Hiroyuki et al. | |

OTHER PUBLICATIONS

Sutoh et al., "Circuit Technique for Skew–Free Clock Distribution", Proceedings of the Custom Integrated Circuits Conference, Santa Clara, May 1–4, 1995, No. Conf. 17, Institute of Electrical and Electronics Engineers, May 1, 1995, pp. 163–166.

Suzuki et al., "A 500 MHZ, 32 Bit, 0.4 MUM CMOS RISC Processor", vol. 29, No. 12, Dec. 1994, pp. 1464–1473.

"Nikkei Microdevice", Nikkei PB Company, pp. 81 to 85, Feb., 1993.

"A CMOS 500 . . . ", 1994 Symposium on VLSI, by S. Sidiropoulos.

*Primary Examiner*—Vit W. Miska
*Attorney, Agent, or Firm*—Rabin, Champagne, & Lynt, P.C.

[57] ABSTRACT

A clock distributing circuit, that comprises a clock distribution output circuit for inputting an external clock, outputting a first clock that synchronizes with the external clock, and distributing the first clock to each of load circuits, and a distributed clock input circuit disposed on input stages of all or part of the load circuits and adapted for inputting the first clock and outputting a second clock that synchronizes with the input clock, wherein one of the clock distribution output circuit and the distributed clock input circuit includes a phase difference-voltage converting circuit for converting the phase difference between the input clock and the output clock into a voltage, and a voltage control type delay circuit for delaying the input clock corresponding to an output voltage of the phase difference-voltage converting circuit and for outputting the delayed input clock.

7 Claims, 12 Drawing Sheets

PFDD2 PHASE/FREQUENCY DIFFERENCE DETECTING CIRCUIT

FIG. 11A
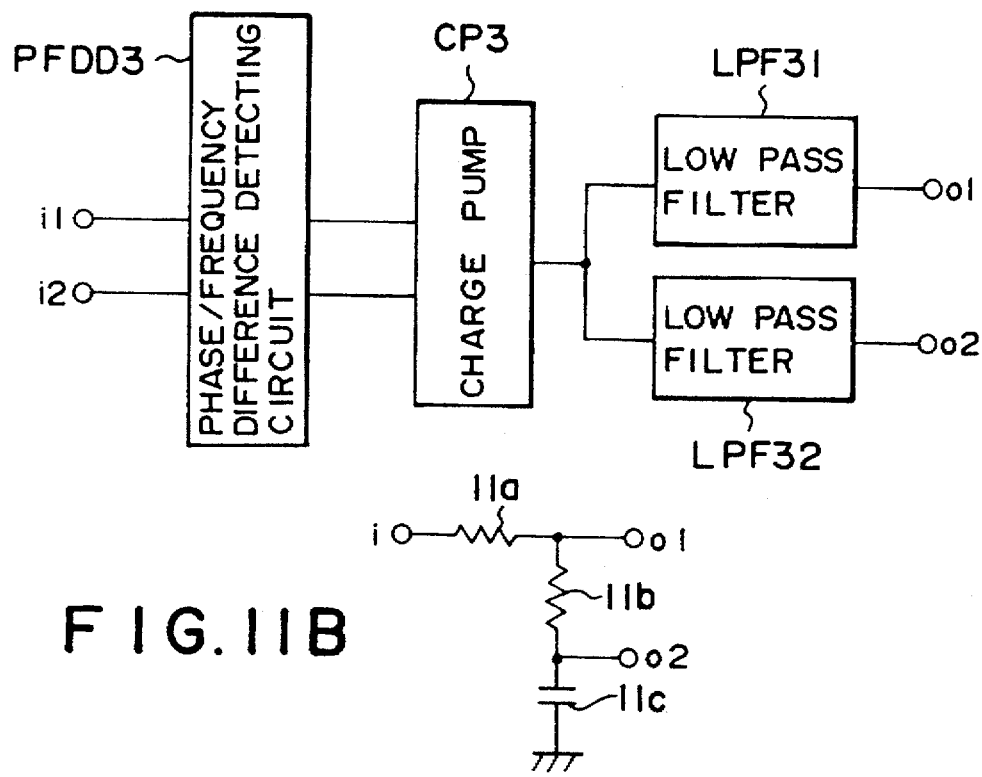
FIG. 11B
FIG. 12
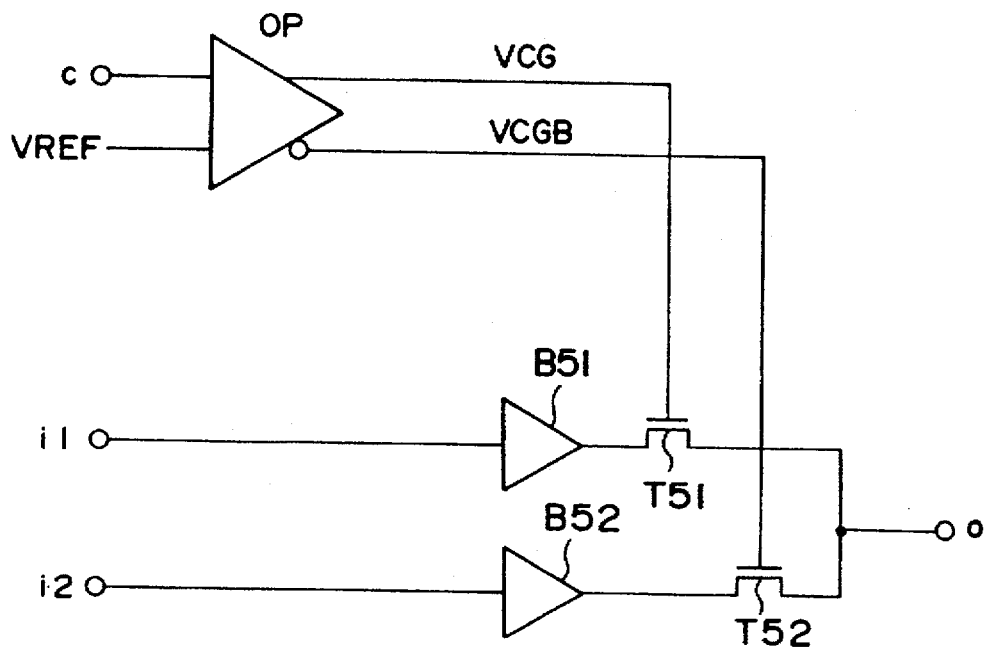

F I G. 14
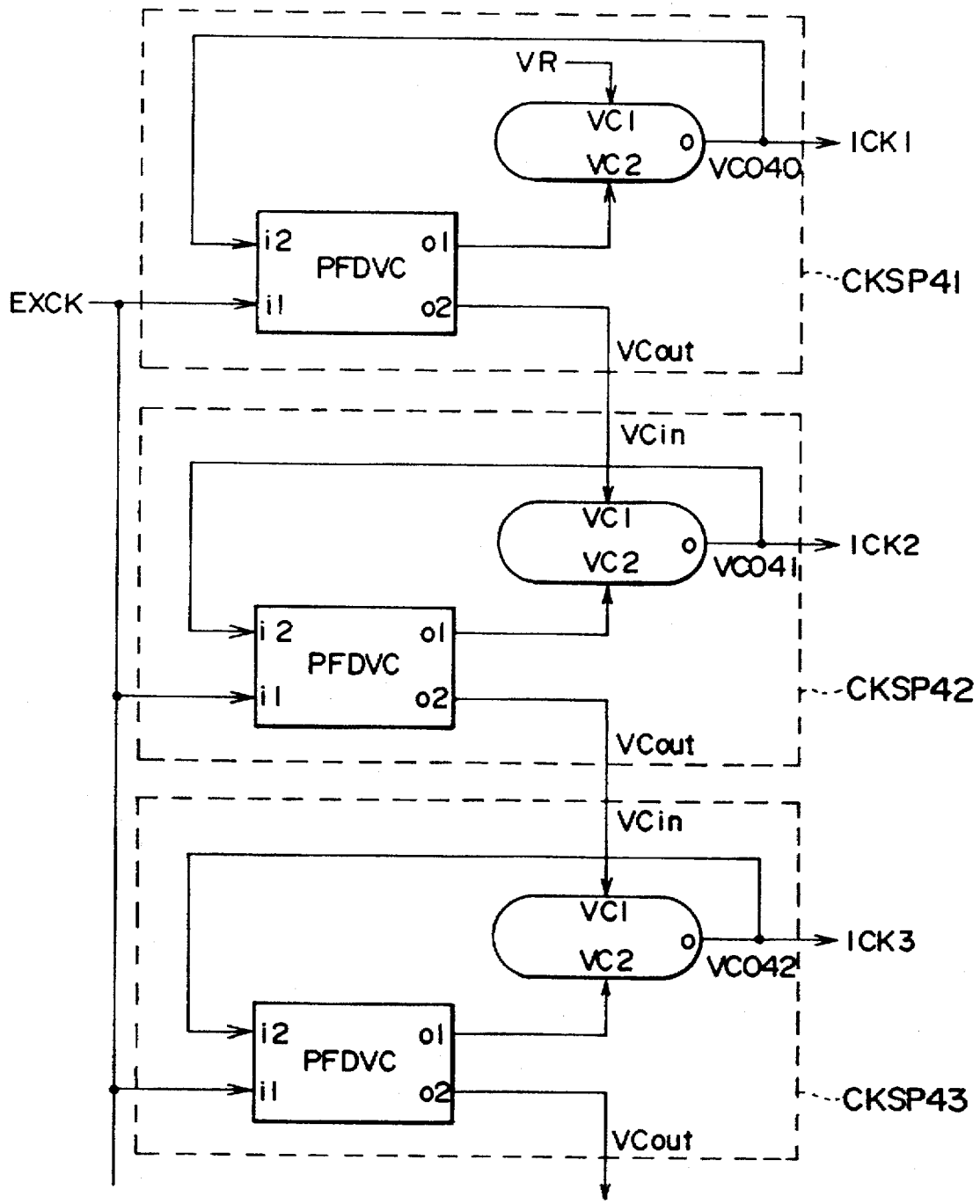

CLOCK DISTRIBUTING CIRCUIT

REFERENCE TO RELATED APPLICATION

This application claims the priority right under 35 U.S.C. 119, of Japanese Patent Application No. Hei 07-179081 filed on Jul. 14, 1995, the entire disclosure of which is incorporated herein by reference.

BACKGROUND OF THE INVENTION

1. Field of the Invention

The present invention relates to a clock distributing circuit for distributing clock pulses (hereinafter referred to as a clock) to a plurality of circuits. In particular, the present invention relates to a clock distributing circuit for use with a circuit system on which a plurality of semiconductor chips with a chip size of 1 cm$^2$ or more are disposed.

2. Description of the Related Art

FIG. 1 is a schematic diagram showing a conventional clock distributing circuit. In FIG. 2, the clock distributing circuit comprises an external clock input terminal EXEC and a plurality of clock buffers CKBFF1, CKBFF2, and so forth. The external clock input terminal EXCK inputs an external clock. The clock buffers CKBFF1, CKBFF2, and so forth are connected in a tree shape. The clock is input from the external clock input terminal EXCK and branched to a plurality of load circuits LD1, LD2, and so forth by the clock buffers CKBFF1, CKBFF2, and so forth.

To drive the many load circuits LD1, LD2, and so forth that have large capacitance, the load circuits LD1,.LD2, and so forth should be connected to the clock buffers CKBFF1, CKBFF2, and so forth in such a manner that the drive capacity thereof increase successively. In the clock distributing circuit connected with a plurality of clock buffers CKBFF1, CKBFF2, and so forth, due to delay of the clock in the clock buffers CKBFF1, CKBFF2, and so forth, a large clock skew takes place between the external clock input terminal EXCK and each of the click input terminals of the load circuits LD1, LD2, and so forth.

To solve the skew, a method of which a clock buffer CKBFF having a PLL (Phase-Locked Loop) shown in FIG. 3 has been proposed as in Reference 1.

Reference 1, "Nikkei Microdevice", Nikkei PB Company, pp. 81 to 85, Feb. 1993.

In FIG. 2, the CKBFF is disposed between an external clock input terminal EXEC and each of load circuits LD1, LD2, and so forth. The CKBFF has a PLL circuit composed of a phase/frequency difference-voltage converting circuit (hereinafter referred to as a PFDVC) that converts a phase/frequency difference into a DC voltage and a voltage control type oscillator (hereinafter referred to as a VCO). The output clock of the clock buffer CKBFF is supplied to each of the clock input terminals of the load circuit LD1, LD2, and so forth.

The PLL circuit causes the input clock of the external clock input terminal EXCK to synchronize with the output clock of the clock buffer CKBFF, thereby minimizing the phase difference thereof. Thus, when the output portion of the VCO has a buffer circuit with a high drive performance, the clock can be distributed to the load circuits LD1, LD2, and so forth without a clock skew caused by a delay of the clock in the clock buffer CKBFF.

However, even if the method using the clock buffer CKBFF with the PLL circuit is employed, the following problem takes place.

In lines that connect the clock buffer CKBFF and each of the load circuits LD1, LD2, and so forth, a transmission delay due to a stray resistance and a stray capacitance takes place, thereby causing a clock skew.

When the load circuits LD1, LD2, and so forth are formed on respective semiconductor chips, each of the load circuits LD1, LD2, and so forth requires a clock buffer. When conventional clock buffers are used, they cause clock skews. In such a large scaled circuit, even if one clock buffer with the PLL circuit as a clock buffer on the distribution side is disposed, the clock skew cannot be satisfactorily reduced.

To solve this problem, in addition to the common clock buffer with a PLL circuit, a local clock buffer with a PLL circuit may be disposed for each load circuit. However, when clock buffers with PLL circuits are cascade connected, the stable time of the clock of the load circuit depends on the sum of the follow-up time of each clock buffer. (The follow-up time is a time period until the follow-up operation of the PLL circuit effectively operates against an variation of the input clock in the condition that the phase difference between the input clock and the output crook is less than a predetermined value.) Thus, the system does not quickly operate.

Moreover, although a PLL circuit for a clock buffer in a load circuit operates for removing the phase difference between the input clock and the output clock, it can be said that the PLL circuit does not well operate for removing the clock skew due to a transmission delay on lines connected between the common clock buffer and the load circuit.

SUMMARY OF THE INVENTION

The present invention is made from the above-described point of view. An object of the present invention is to provide a clock distributing circuit that can more reduce the clock skew and the clock stable time than before and that can be used for a large scaled circuit.

A first aspect of the present invention is a clock distributing circuit, comprising a clock distribution output circuit for inputting an external clock, outputting a first clock that synchronizes with the external clock, and distributing the first clock to each of load circuits, and a distributed clock input circuit disposed on input stages of all or part of the load circuits and adapted for inputting the first clock and outputting a second clock that synchronizes with the input clock.

One of the clock distribution output circuit and the distributed clock in put circuit includes a phase difference-voltage converting circuit for converting the phase difference between the input clock and the output into a voltage, and a voltage control type delay circuit for delaying the input clock corresponding to an output voltage of the phase difference-voltage converting circuit and for outputting the delayed input clock.

A second aspect of the present invention is a clock distributing circuit, comprising a clock distribution output circuit for inputting an external clock, outputting a first clock that synchronizes with the external clock and that has a phase with an advance against the phase of the external clock and a second clock that synchronizes with the external clock and that has a phase with a delay against the phase of the external clock, and distributing the first clock and the second clock to each of load circuits, and distributed clock input circuits disposed on input stages of all or part of the load circuits and adapted for inputting the first clock, the second clock, and the external clock and outputting a third clock that synchronizes with the external clock. The clock distribution output circuit includes a voltage control type oscillator for generating a fourth clock corresponding to a first control voltage, a voltage control type delay circuit for delaying the external clock corresponding to the second control voltage and outputting the first clock and the second clock, and a phase/frequency difference-voltage converting circuit for converting the phase/frequency difference between the external clock and the fourth clock into a voltage and outputting the first control voltage and the second control voltage. Each of the distributed clock input circuits includes a phase difference-voltage converting circuit for converting the phase difference between the external clock and the third clock that is output from the distributed clock input circuit into a voltage, and a voltage control type phase shifter for generating the third clock with the first and second clocks corresponding to an output voltage of the phase difference-voltage converting circuit.

A third aspect of the present invention is a clock distributing circuit having a plurality of clock synchronizing circuits with a PLL circuit structure or a delay locked loop circuit structure for generating a clock that synchronizes with an input clock.

Each of the clock synchronizing circuits comprises a phase/frequency difference-voltage converting circuit for converting the phase/frequency difference between the input clock and a clock that is output from the clock synchronizing circuit into a first control voltage and a second control voltage, and a voltage control type oscillator or a delay circuit for varying the frequency and/or the phase of a clock that is output from the phase/frequency difference-voltage converting circuit corresponding to the first and second control voltages. The first control voltage supplied from the phase/frequency difference-voltage converting circuit of an N-th clock synchronizing circuit is supplied to the voltage control type oscillator or the delay circuit of the N-th clock synchronizing circuit and the second control voltage is supplied to a voltage control type oscillator or a delay circuit of an (N+1)th clock synchronizing circuit.

A fourth aspect of the present invention is a clock distributing circuit connected to a plurality of clock synchronizing circuits having a PLL circuit structure or a delay locked loop structure for generating a clock that synchronizes with an input clock.

Each of the clock synchronizing circuits includes a phase/frequency difference-voltage converting circuit for converting a phase difference and/or a frequency difference between the input clock and a clock that is output from the clock synchronizing circuit into a first control voltage and a second control voltage, and a voltage control type oscillator or a delay circuit for varying the frequency and/or the phase of a clock that is output from the phase/frequency difference converting circuit corresponding to the first and second control voltages. The first control voltage that is output from a phase/frequency difference-voltage converting circuit of each of the clock synchronizing circuits included in an N-th staged branch is supplied to a voltage control type oscillator or a delay circuit in the clock synchronizing circuit and the second control voltage is supplied to a voltage control type oscillator or a delay circuit of the clock synchronizing circuit included in an (N+1)th staged branch.

According to the clock distributing circuit of the first aspect of the present invention, a so-called DLL circuit structure is used for one of a clock distribution output circuit or a distributed clock input circuit. When the other circuit is a PLL circuit that has a conventional synchronous circuit structure, the disadvantages of the DLL circuit and the PLL circuit are compensated each other. Thus, the advantages of these circuits can be effectively obtained.

According to the clock distributing circuit of the second aspect of the present invention, a clock distribution output circuit outputs a first clock and a second clock. The first clock synchronizes with an external clock and has a phase with an advance against the phase thereof. On the other hand, the second clock synchronizes with the external clock and has a phase with a delay against the phase thereof. The first clock and the second clock are distributed to each of load circuits. A distributed clock input circuit disposed at an input stage of all or part of the load circuits outputs a third clock that synchronizes with the external clock corresponding to the first clock, the second clock, and the external clock. At this point, a voltage control type phase shifter of the distributed clock input circuit varies a weighted combined amount of the first clock and the second clock corresponding to an output voltage of a phase difference-voltage converting circuit, thereby generating the third clock. In other words, each load is divided and dispersed to two stages. A synchronizing circuit having a phase shifter with a higher linearity of phase difference-voltage converting characteristics is disposed in the later stage.

According to the clock distributing circuit of the third and fourth aspects of the present invention, a plurality of clock synchronizing circuits that have a PLL circuit structure or a DLL circuit structure that generates a clock that synchronizes with an input clock are disposed. A control voltage corresponding to the phase difference or the frequency difference in a particular clock synchronizing circuit is supplied to both the local clock synchronizing circuit and another clock synchronizing circuit disposed in a later stage thereof.

The difference between the clock distributing circuits of the third and fourth aspects of the present invention, the clock synchronizing circuits that receive control voltages are disposed in parallel or in a tree shape (hierarchical structure) on the input terminal side of the external clock.

Thus, according to the present invention, the output clock is coarsely controlled by the clock distribution output circuit and the clock synchronizing circuit disposed on the preceding stage thereof so that the output clock synchronizes with the external clock. The frequency difference and the phase difference against the external clock are removed by the distributed clock input circuit and the clock synchronizing circuit disposed on the later stage thereof. Thus, the skew difference removed by each circuit is decreased. Consequently, the jitter is decreased. In addition to the decrease of the skew removing time, the operation is performed partially in parallel with the follow-up operation of the circuit disposed on the preceding stage thereof. Thus, the system startup time can be reduced in comparison with the conventional structure of which PLL circuits are multiply staged.

In addition, the load of each circuit is reduced. A clock with a higher frequency can be distributed. Thus, the clock stable time of each load circuit becomes short.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 11 is a block diagram showing a structure of a phase/frequency difference-voltage converting circuit (No. 2);

FIG. 12 is a block diagram showing a structure of a voltage control type phase shifter;

FIG. 14 is a block diagram showing a structure of a fourth embodiment of the present invention;

DESCRIPTION OF THE PREFERRED EMBODIMENTS

(A) FIRST EMBODIMENT

Next, with reference to the accompanying drawings, a clock distributing circuit according to a first embodiment of the present invention will be described.

(A-1) Structure of First Embodiment

Figure 3:
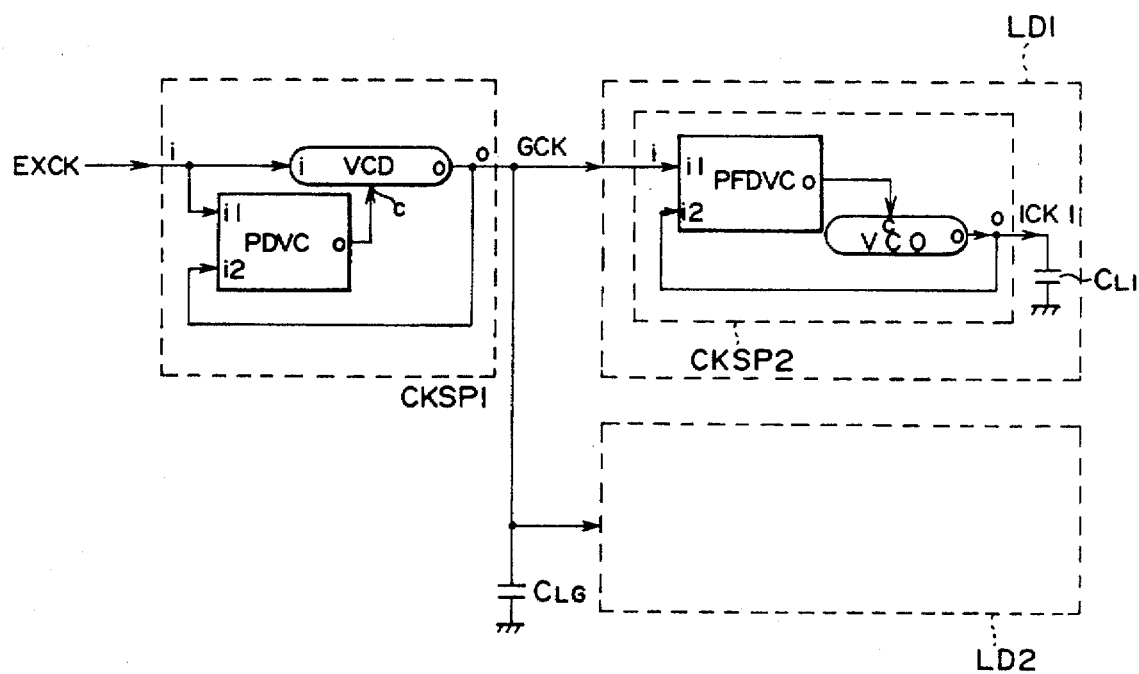
FIG. 3 is a block diagram showing a structure of a first embodiment of the present invention.

FIG. 3 is a block diagram showing a structure of a clock distributing circuit according to the first embodiment of the present invention. In FIG. 3, the clock distributing circuit comprises an external clock input terminal EXCK (this also represents a clock type), a clock distribution output circuit CKSP1, and at least one load circuit LD1, LD2, and so forth. The clock distribution output circuit CKSP1 is connected to the external clock input terminal EXCK. The load circuits LD1, LD2, and so forth receive the clock from the clock distribution output circuit CKSP1 through a global clock line GCK (this also represents a clock type).

Figure 1:
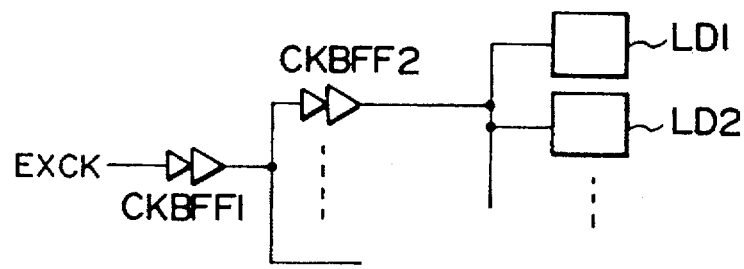
FIG. 1 is a block diagram showing a structure of a conventional circuit (No. 1)
Figure 2:
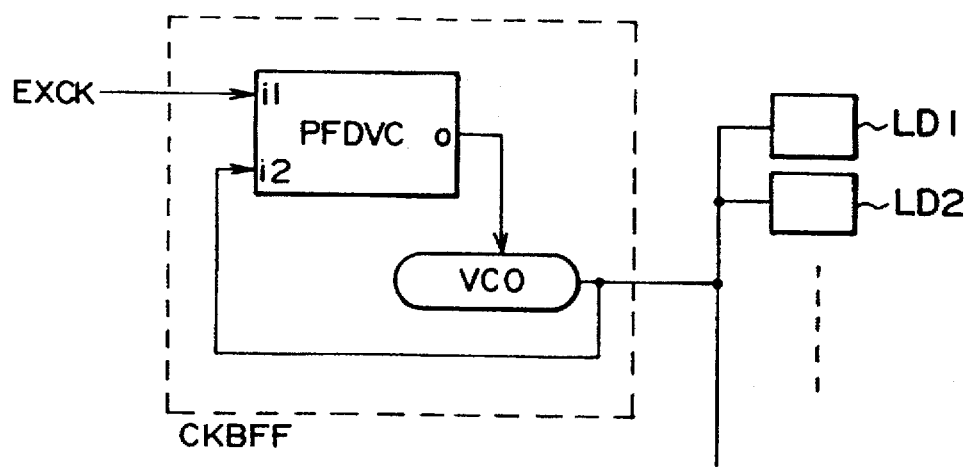
FIG. 2 is a block diagram showing a structure of a conventional circuit (No. 2)

All or part of the load circuits LD1, LD2, and so forth have a distributed clock input circuit CKSP2 (LD1 and LD2 in FIG. 1). A clock is input to the distributed clock input circuit CKSP2 through the global clock line GCK. The clock that is output from the distributed clock input circuit CKSP2 is supplied to an internal clock line ICK1 (that also represents a clock type) of the load circuit so as to drive a load capacitance CL1. (In this example, it is assumed that since each load circuit is composed of a MOS transistor and so forth, only the load capacitance is considered. However, of course, a resistor component may be formed.)

The clock distribution output circuit CKSP1 is composed of a phase difference-voltage converting circuit (hereinafter referred to as a PDVC) and a voltage control type delay circuit (hereinafter referred to as a VCD). The PDVC converts a phase difference into a voltage. A clock input terminal i of the clock distribution output circuit CKSP1 is connected to a first input terminal i1 of the PDVC and a input terminal i of the VCD. A clock output terminal o of the clock distribution output circuit CKSP1 is connected to an output terminal o of the VCD and an input terminal i2 of the PDVC. An output terminal o of the PDVC is connected to a control terminal c of the VCD.

In other words, the clock distribution output circuit CKSP1 has a so-called delay locked loop circuit (hereinafter referred to as a DLL circuit). The DLL circuit is for example described in Reference 2.

Reference 2—Stefanous Sidiropoulos, et. al, "A CMOS 500 Mbps/pin synchronous point to point link interface", IEEE, 1994 Symposium on VLSI Circuits Digest of Technical Papers, pp. 43–44, June, 1994.

Figure 4:
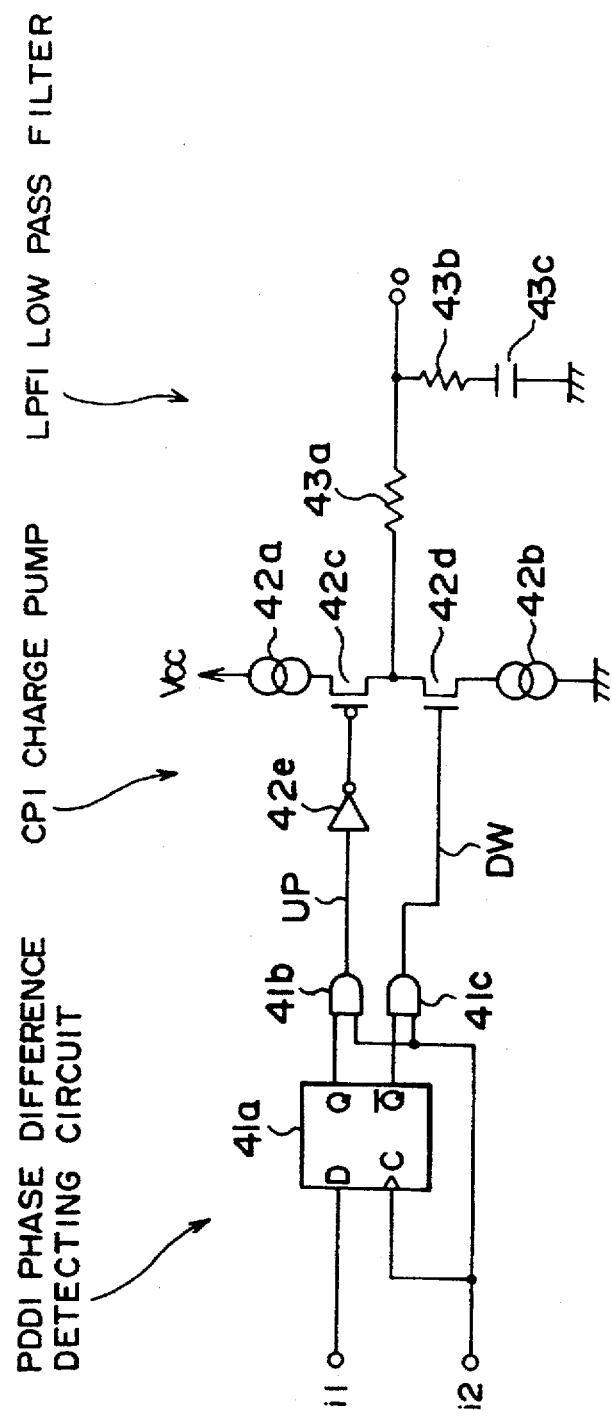
FIG. 4 is a block diagram showing a structure of a phase/frequency difference-voltage converting circuit (No. 1)

FIGS. 4 and 5 show examples of structures of the PDVC and the VCD (that have no relation with the Reference 2), respectively.

In FIG. 4, the PDVC is composed of a phase difference detecting circuit PDD1 (that may be a phase/frequency difference detecting circuit PFDD2 that will be described later), a charge pump CP1, and a low pass filter LPF1.

The phase difference detecting circuit PDD1 is for example composed of a D-type flip-flop 41a and two AND gates 41b and 41c. The logic level of an input clock i1 supplied to a D input terminal of the D-type flip-flop 41a is detected when the logic level of a feed-back clock i2 supplied from the VCD becomes high. Output signals Q and Q/ are supplied to the AND gates 41b and 41c that are opened or closed with each of the input clock i1 or the feed-back clock i2. (Although the negative logic of Q is denoted by Q bar ($\overline{Q}$) in the accompanying drawings, Q/ is used instead thereof for easy notation). Thus, the logic level of an output signal UP supplied from the AND gate 41b becomes "H" during the (time) period from the leading (or rising) edge of the input clock i1 to the leading (or rising) edge of the feed-back clock i2, only when the input clock i1 has a phase with an advance against the phase of the feed-back clock i2. On the other hand, the logic level of an output signal DW supplied from AND gate 41c becomes "H" during the (time) period from the leading (or rising) edge of the feed-back clock i2 to the leading (or rising) edge of the input clock i1 only when the feed-back clock has a phase with an advance against the phase of the input clock i1.

The charge pump CP1 is composed of two current sources 42a and 42b, two switching transistors 42c and 42d, and an inverter 42e. When the logic level of the signal UP is "H", the signal UP is supplied to a gate of the PMOS transistor 42c through the inverter 42e. Thus, the PMOS transistor 42c is turned on and a current is charged to the low pass filter LPF1. When the logic level of the signal DW is "H", the signal DW is supplied to a gate of the NMOS transistor 42d. Thus, the NMOS transistor 42d is turned on a current is discharged from the low pass filter LPF1.

As shown in FIG. 4, the low pass filter LPF1 is composed of two resistors 43a and 43b and a condenser 43c. For simplicity, the description of the operation of the low pass filter LPF1 is omitted.

Figure 5A:
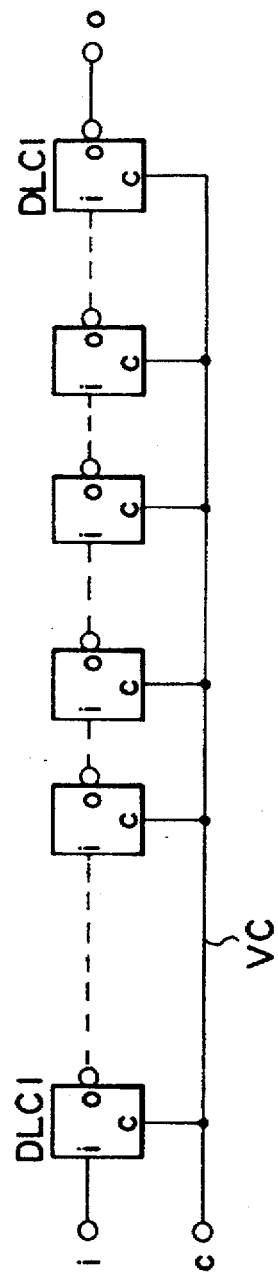
FIG. 5 is a block diagram showing a structure of a voltage control type delay circuit.
Figure 5B:
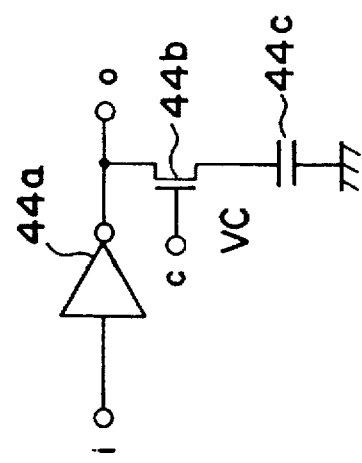

On the other hand, as shown in FIG. 5(a), the VCD is composed of a plurality of delay cells DLC1 that are cascade connected and of which a control voltage VC is supplied in common to control terminals of the delay cells DLC1. As shown in FIG. 5(b), each of the delay cells DLC1 is composed of an inverter 44a, an NMOS transistor 44b, and a condenser 44c. The NMOS transistor 44b and the condenser 44c are connected in series between an output terminal of the inverter 44a and the ground. When the control voltage VC varies, the time constant of a charging/ discharging circuit composed of the NMOS transistor 44b and the condenser 44c varies. Thus, the output variation speed of the inverter 44a varies, thereby varying the delay time of the entire VCD.

Returning to FIG. 3, the distributed clock input circuit CKSP2 disposed in each of the load circuit LD1, LD2, and so forth includes a known PLL circuit that has the PFDVC and the VCO.

Figure 6:
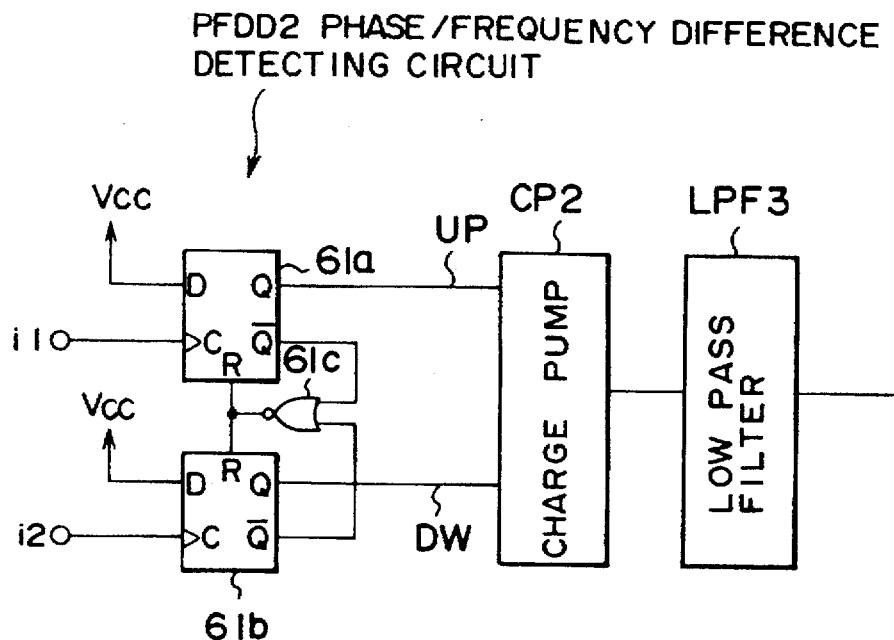
FIG. 6 is a block diagram showing a structure of a phase difference-voltage converting circuit.

Next, an example of the structure of the PFDVC will be described. As shown in FIG. 6, PFDVC is composed of a phase/frequency difference detecting circuit PFDD2 (that may be the phase difference detecting circuit PDD1 shown in FIG. 4), a charge pump CP2, and a low pass filter LPF2 (the structures of the charge pump CP2 and the low pass filter LPF2 are the same as those shown in FIG. 4). The phase/frequency difference detecting circuit PFDD2 is composed of a D-type flip-flop 61a, a D-type flip-flop 61b, and a NOR gate 61c. A D input terminal of the D-type flip-flop 61a is pulled up. An input clock i1 is supplied to a clock input terminal of the D-type flip-flop 61a. A D input terminal of the D-type flip-flop 61b is pulled up. An input clock i2 is supplied to a clock input terminal of the D-type flip-flop 61b. Output signals Q/ of the flip-flops 61a and 61b are supplied to reset input terminals of the D-type flip-flops 61a and 61b through the NOR gate 61c. The logic level of the Q output of the D-type flip-flop 61a becomes "H" from the leading edge of the input clock I1 to the reading edge of the feed-back clock i2. Alternatively, the logic level of the Q output of the D-type flip-flop 61b becomes "H" from the leading edge of the feed-back clock i2 to the leading edge of the input clock i1. Thus, the D-type flip-flop 61a outputs the signal UP or the D-type flip-flop 61b outputs the signal DOWN. The period of which the logic levels of the signals UP and DOWN in the phase difference detecting circuit PDD1 are "H" is ½ clock period or less. On the other hand, the period of which the logic levels of the signals UP and DOWN in the phase/frequency difference detecting circuit PFDD2 is close to one clock period.

Figure 7:
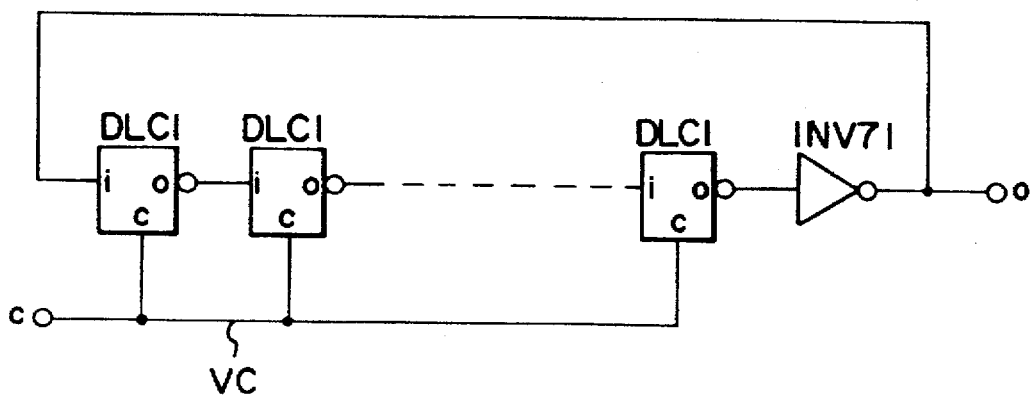
FIG. 7 is a block diagram showing a structure of a voltage control type oscillator.

FIG. 7 is a schematic diagram showing a structure of the VCO. The VCO shown in FIG. 7 is composed of a plurality of delay cells DLC1 and an inverter INV 71 that are connected in a ring shape so as to structure a ring oscillator. A control voltage VC is supplied in common to control terminals of the delay cells DLC1.

As described above, the clock distributing circuit according to the first embodiment comprises the clock distribution output circuit (which includes the DLL circuit) and the distributed clock input circuit (that includes the PLL circuit).

(A-2) Operation of First Embodiment

Figure 8:
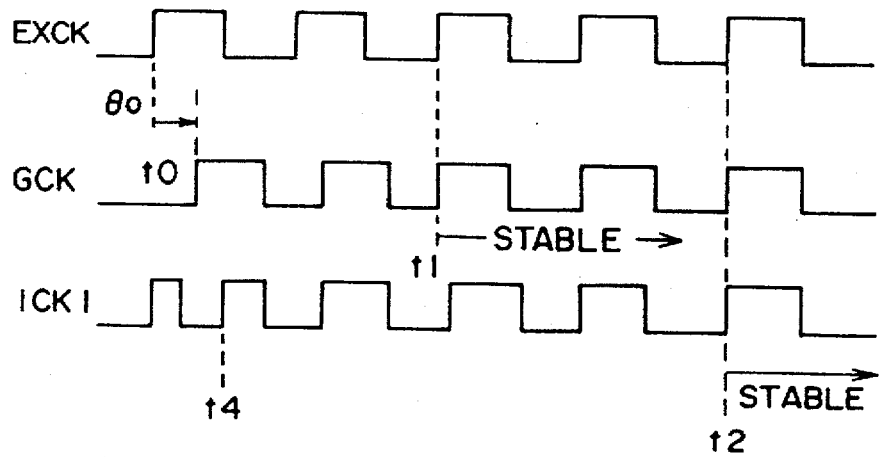
FIG. 8 is a schematic diagram showing wave forms of signals of the first embodiment of the present invention.

FIG. 8 is a schematic diagram showing wave forms of clocks for explaining the operation of the first embodiment. Just after an external clock is supplied, a phase offset error Θ0 is present between the external clock at the external clock input terminal EXCK and a global clock on the global clock line GCK. The PDVC of the clock distribution output circuit CKSP1 converts the error Θ0 into a voltage. The VCD is controlled corresponding to this voltage so that Θ0 decreases. Thus, when time elapses to some extent (at time t1), the clock skew between the external clock and the global clock disappears. In addition, the VCD delays the input clock. Thus, just after the external clock is supplied, the frequency of the external clock is almost the same as the frequency of the global clock.

With the follow-up operation of the PLL circuit in the distributed clock input circuit CKSP2, the output clock supplied to the internal clock line ICK1 is synchronized with the clock on the global clock line GCK. At this point, in a broad sense, the frequency of the internal clock is matched with the frequency of the global clock. Thereafter, the phase difference between these clocks is removed. As described above, since the clock distribution output circuit CKSP1 causes the frequency of the global clock to match the frequency of the external clock just after the external clock is supplied, the frequency matching operation of the distributed clock output circuit CKSP2 is performed before the follow-up operation of the DLL circuit of the clock distribution output circuit CKSP1 is completed (in other words, the frequency matching operation is performed before time t1). Generally, the follow-up time (t0 to t1) of the DLL circuit is shorter than that of the PLL circuit. The stable time after the external clock is supplied until the clock supplied to the entire system becomes stable almost depends on the follow-up time (t4 to t2) of the PLL circuit of the distributed clock input circuit CKSP2.

(A-3) Effect of First Embodiment

As described above, according to the first embodiment, the clock distribution output circuit that includes the DLL circuit supplies the global clock that synchronizes with the external clock to each load circuit. In addition, each load circuit has the distributed clock input circuit that supplies a clock that synchronizes with the global clock thereto. Thus, the following effects can be obtained.

(1) Since the loads of the clock distribution output circuit and each of the distributed clock input circuits are reduced in comparison with the conventional structure of which all load circuits are driven by the clock distributing circuit that has one PLL circuit. Thus, the clock skew due to the stray capacitance or the like is decreased. Consequently, a clock with a higher frequency than the of the conventional structure can be supplied to a large scaled circuit.

(2) Almost when the synchronizing operation of the DLL circuit of the clock distribution output circuit starts, the follow-up operation of the PLL circuit of the distributed clock input circuit starts. Thus, the clock of the system becomes stable in a short time. Consequently, the system can be quickly started up.

Generally, the PLL circuit more can quickly removes a large phase/frequency difference than the DLL circuit. However, when two staged PLL circuits are connected, after the first staged PLL circuit becomes stable, the second staged PLL circuit starts the follow-up operation. Thus, it takes a time until the system starts up. When the system starts up, it is difficult to reduce the phase/frequency difference to a desired level. On the other hand, the DLL circuit can quickly adjust a frequency difference. In addition, the DLL circuit can precisely adjust small phase difference. However, the DLL circuit takes a longer time to remove a large phase difference than the PLL circuit. Thus, when a plurality of DLL circuits are disposed, it takes a long time until the system starts up.

Consequently, to accomplish the above-described effects, it is preferable to provide the clock distribution output circuit including the DLL circuit that supplies the global clock that synchronizes with the external clock to each load circuit and each load circuit including the PLL circuit that supplies a clock that synchronizes with the global clock to the load circuit as with the first embodiment.

(3) Since the distributed clock input circuit including the PLL circuit is disposed for each load circuit, the phase error difference (due to the time constant of the low pass filter) of the PLL circuit can be optimized for each load circuit. Thus, the jitter of the clock can be reduced. If necessary, a frequency dividing circuit is disposed between the VCO and the PFDVC in the distributed clock input circuit of a particular load circuit so as to form a frequency synthesizer. Thus, a clock with a frequency several times higher than the frequency of the global clock can be supplied.

(4) When a delay circuit corresponding to the clock skew due to the global clock line is disposed in a feed-back loop from the VCD to the PDVC in the clock distribution output circuit, the clock skew due to the line from the clock distribution output circuit to the load circuit can be reduced.

(B) Second Embodiment

Next, with reference to the accompanying drawings, a clock distributing circuit according to a second embodiment will be described.

(B-1) Structure of Second Embodiment

Figure 9:
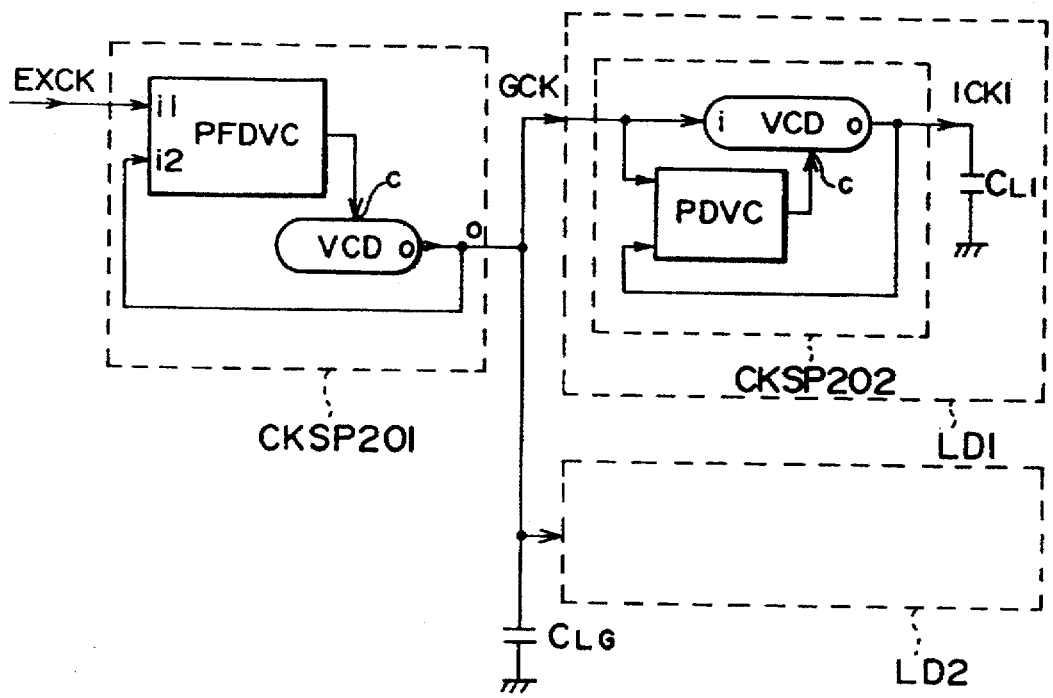
FIG. 9 is a block diagram showing a structure of a second embodiment of the present invention.

FIG. 9 is a block diagram showing a structure of a clock distributing circuit according to a second embodiment of the present invention. In FIG. 9, the clock dividing circuit according to the second embodiment comprises a clock distribution output circuit CKSP 201 that distributes a clock to load circuits LD1, LD2, and so forth. The clock distribution output circuit CKSP 201 supplies a clock that synchronizes with an external clock that is supplied from an external clock input terminal EXCK to the load circuits LD1, LD2, and so forth through an inner global clock line GCK.

However, the clock distribution output circuit CKSP 201 according to the second embodiment does not include a DLL circuit, but a PLL circuit.

On the other hand, in the input stage of all or part of the load circuits LD1, LD2, and so forth of the second embodiment, a distributed clock input circuit CKSP 202 is disposed. The distributed clock input circuit CKSP 202 generates an internal clock that synchronizes with a global clock on the global clock line GCK and supplies the internal clock to the load circuits LD1, LD2, and so forth.

However, the distributed clock input circuit CKSP 202 according to the second embodiment does not include the PLL circuit, but the DLL circuit.

The clock distribution output circuit CKSP 201 that includes the PLL circuit according to the second embodiment has the same PFDVC and VCO that are the same as those of the distributed clock input circuit CKSP2 that includes the PLL circuit according to the first embodiment. The distributed clock input circuit CKSP202 that includes the DLL circuit according to the second embodiment has the same PDVC and VCD as those of the clock distribution output circuit CKSP1 that includes the DLL circuit according to the first embodiment.

(B-2) Operation of Second Embodiment

In the second embodiment, when an external clock is input, the clock distribution output circuit CKSP 201 that includes the PLL circuit performs the follow-up operation. Thus, the clock skew between the external clock supplied from the external clock input terminal EXCK and the global clock on the global clock line GCK is removed. The DLL circuit included in the distributed clock input circuit CKSP 202 removes the phase difference between the internal clock on the internal clock line ICK1 of each of the load circuits LD1, LD2, and so forth and the global clock on the global clock line GCK.

Thus, in the second embodiment, until the follow-up operation of the PLL circuit of the clock distribution output circuit CKSP 201 progresses to some extent and the frequency difference between the external clock and the global clock becomes small, the distributed clock input circuit CKSP 202 cannot effectively remove the skew.

Thus, the clock stable time of the second embodiment is slightly longer than the clock stable time of the first embodiment. However, the clock distributing circuit according to the second embodiment has the following advantages in operation over the structure of which two PLL circuits are cascade connected.

In other words, when the phase error is small, the phase error response of the distributed clock input circuit including the DLL circuit is much faster than that of the structure including the PLL circuit. In addition, the clock distribution output circuit CKSP 201 removes a large skew between the external clock and the global clock. Thus, the distributed clock input circuit CKSP 202 only removes skews that take place in a small circuit range of the load circuits LD1, LD2, and so forth. Consequently, the distributed clock input circuit CKSP 202 can remove the skew between the global clock and the internal clock in a very short time. As a result, the startup time of the system can be remarkably reduced in comparison with the structure of which two PLL circuits are cascade connected.

In addition, since the first staged clock distribution output circuit CKSP 201 includes the PLL circuit that has a wider operating frequency range (thus, the system can be more easily designed) than the structure including the DLL circuit, the restriction of the external clock can be alleviated and a wide operating frequency range can be obtained. Generally, in the PLL circuit, information of the frequency difference between the input clock and the output clock is input to the VCO. Thus, the VCO oscillates corresponding to the information of the frequency difference. On the other hand, in the DLL circuit, information of the phase difference between the input clock and the output clock is input to the VCD. Thus, the VCD controls the delay amount corresponding to the information of the phase difference. In other words, the PLL circuit controls the oscillation frequency of the output clock of the VCO. On the other hand, the DLL circuit controls the delay amount of the VCD. Thus, since the operating frequency range of the PLL circuit is wider than the operating frequency range of the DLL circuit. Consequently, a system with the PLL circuit can be more easily designed than a system with the DLL circuit.

(B-3) Effects of Second Embodiment

As described above, according to the second embodiment, the clock distribution output circuit CKSP 201 including the PLL circuit is disposed in common with the load circuits LD1, LD2, and so forth. In addition, the distributed clock input circuit CKSP 202 including the DLL circuit is disposed on the input stage of each of the load circuits LD1, LD2, and so forth. Thus, the clock distributing circuit according to the second embodiment has following effects.

(1) The loads that the clock distribution output circuit and the distributed clock input circuit drive can be reduced. Thus, a clock with a high operating frequency can be obtained as with the first embodiment.

(2) Since the first staged clock distribution output circuit includes the PLL circuit, the clock distributing circuit can operate in a wide frequency range.

(3) The clock distribution output circuit remove a large clock skew. In addition, the distributed clock input circuit disposed in each of the load circuits removes the clock skew in the load circuit. Thus, the clock distributing circuit according to the second embodiment can quickly remove the clock skew. Consequently, the system startup time of the second embodiment is shorter than that of the structure of which two PLL circuits are cascade connected and that of the structure of which two DLL circuits are cascade connected.

(4) When a delay circuit corresponding to the clock skew due to the global clock line or the like is disposed in the feed-back loop from the VCO to the PFDVC of the clock distribution output circuit, the clock skew due to the line from the clock distribution output circuit to the load circuit can be reduced.

(C-1) Third Embodiment

Next, with reference to the accompanying drawings, a clock distributing circuit according to a third embodiment of the present invention will be described.

(C-1) Structure of Third Embodiment

Figure 10:
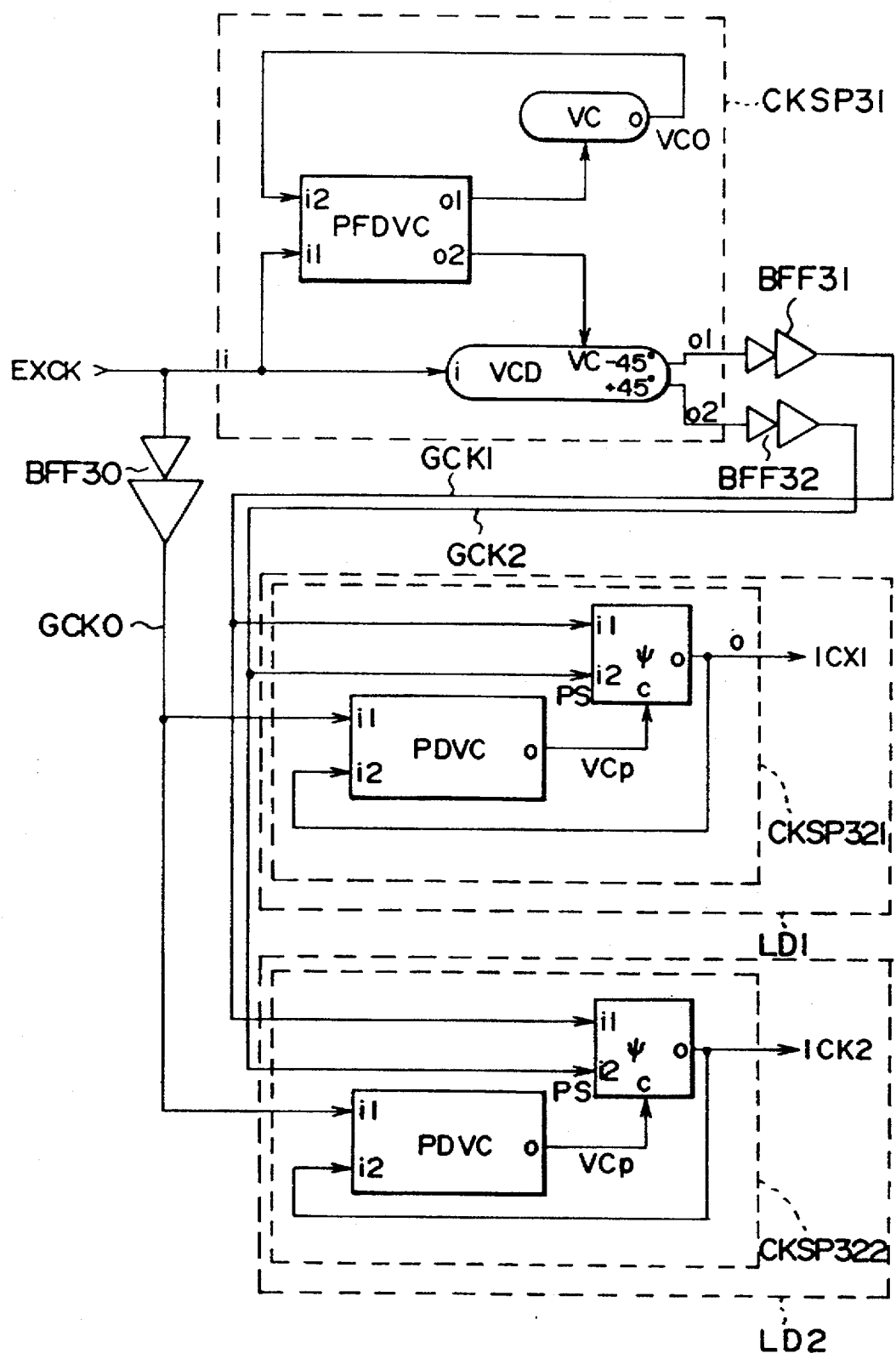
FIG. 10 is a block diagram showing a structure of a third embodiment.

FIG. 10 is a block diagram showing a structure of a clock distributing circuit according to a third embodiment of the present invention.

The clock distributing circuit according to the third embodiment comprises an external clock input terminal EXCK, a clock distribution output circuit CKSP 31, and a plurality of load circuits LD1, LD2, and so forth. The clock distribution output circuit CKSP 31 distributes and supplies a global clock that has a phase with an advance against the phase of an external clock to a first global clock line GCK1. In addition, the clock distribution output circuit CKSP 31 distributes and supplies a clock that has a phase with a delay against the phase of the external clock to a second global clock line GCK2. In this example, the number of load circuits is two.

A first global clock and a second global clock on a first global clock line GCK1 and a second global clock line GCK2 are supplied to input stages of the load circuits LD1, LD2, and so forth. In addition, a 0-th global clock (external clock) on a 0-th global clock line GCK0 supplied from the external clock input terminal EXCK is supplied to the input stages of the load circuits LD1, LD2, and so forth. Distributed clock input circuits CKSP 321, CKSP 322, and so forth that generate and supply internal clocks to the load circuits LD1, LD2, and so forth are disposed. If necessary, buffer circuits BFF 30 to BFF 32 may be disposed on the 0-th to second global clock lines GCK0 to GCK2 so that the 0-th to second global clock lines GCK0 to GCK2 are driven by the respective buffer circuits BFF 30 to BFF 32.

The clock distribution output circuit CKSP 31 is composed of a PFDVC (that controls two voltages), a VCO, and a VCD.

A first output terminal o1 of the PFDVC is connected to a control terminal VC of the VCO. A second output terminal o2 of the PFDVC is connected to a control terminal VC of the VCD. A first input terminal i1 of the PFDVC and an input terminal i of the VDC are connected to an external clock input terminal EXCK through an input terminal i of the clock distribution output circuit CKSP 31. In addition, an output terminal o of the VCO is connected to a second input terminal i2.

The PFDVC according to the third embodiment has the same structure as that shown in FIG. 6. However, as shown in FIG. 11(a), the PFDVC according to the third embodiment has low pass filters LPF 31 and LPF 32 that are connected to a charge pump CP 3 and that outputs signals to the VCO and the VCD unlike with the structure shown in FIG. 6. In the third embodiment, two low pass filters are functionally required. Thus, it is possible to use a structure of which a connected point of a resistor 11b and a condenser 11c that are connected in series between a first output terminal o1 and the ground is a second output terminal o2. In the third embodiment, the cutoff frequency of the low pass filter LPF 32 is lower than the cutoff frequency of the low pass filter LPF 31.

The VCO is for example a ring shaped oscillator of which a plurality of delay cells are connected in a ring shape as shown in FIG. 7.

On the other hand, the VCD has a structure of which a plurality of the same cells shown in FIG. 5(a) are cascade connected. In this case, an output signal is obtained from a predetermined staged delay cell of the VCD. Thus, a global clock that has a predetermined phase difference against the external clock is obtained. In the third embodiment, a first global clock that has a phase with an advance against the phase of the external clock by 45° is output from an output terminal o1. In addition, a second global clock that has a phase with a delay against the phase of the external clock by 45° is output from a second output terminal o2 of the VCD.

Returning to FIG. 10, each of the distributed clock input circuits CKSP 321, CKSP 322, and so forth disposed in the input stages of the load circuits LD1, LD2, and so forth is composed of a PDVC and a voltage control type phase shifter (hereinafter referred to as a PS).

A first input terminal i1 of the PS is connected to a first global clock line GCK1. A second input terminal i2 is connected to a second global clock line GCK2. A first input terminal i1 of the PDVC is connected to the 0-th global clock line GCK0. A second input terminal i2 of the PDVC is connected to an output terminal o of the PS and an output terminal 0 of the distributed clock input circuit. In addition, an output terminal o of the PDVC is connected to a control terminal c of the PS.

The PDVC of each of the distributed clock input circuits CKSP 321, CKSP 322, and so forth may have the structure shown in FIG. 4.

The PS weights and adds the voltages supplied to the input terminals i1 and i2 corresponding to the voltage supplied to the control terminal c and outputs the result to the output terminal o. Thus, the wave forms of the voltages at the input terminal i1 and the input terminal i2 are combined at the output terminal o. Consequently, an output clock with a predetermined phase difference against the external clock is obtained.

In the third embodiment, an internal clock with a phase difference that ranges from +45° to −45° against the external clock and that is almost proportional to the voltage supplied to the control terminal c is obtained and supplied to the internal clock lines ICK1, ICK2, and so forth.

As described above, it is known that the distributed clock input circuits CKSP 321, CKSP 322, and so forth that has the PS that combines two global clocks with a phase difference and supplies an output pulse have much excellent voltage phase converting characteristics than that of the distributed clock input circuit structure having the PLL circuit and DLL circuit composed of voltage control type delay cells.

FIG. 12 is a schematic diagram showing a structure of a PS (voltage control type phase shifter). In FIG. 12, the PS is composed of two buffer means B51 and B52, two transfer gates T51 and T52, and a differential buffer means OP. Each of the buffer means B51 and B52 are composed of an amplifier with a gain of 1 or 2. Likewise, the differential buffer means OP is composed of a differential amplifier with a small gain. The difference between the control voltage c supplied to the PS and a reference voltage VREF is obtained by the differential buffer means OP. As weighting coefficients, a positive phase difference voltage VCG and a reverse phase difference voltage VCGB are supplied to control terminals of the transfer gates T51 and T52, respectively. A first global clock with a phase that advances by 45° against the phase of the external clock is supplied to the buffer means B51. A second global clock with a phase that delays by 45° against the phase of the external clock is supplied to the buffer means B52. Amplified signals that are output from the buffer means B51 and B52 are supplied to the transfer gates T51 and T52, respectively. The amplified signals are weighted by the transfer gates T51 and T52 and supplied to the output gate o. Thus, a combined signal of the amplified signals is obtained as an internal clock from the output terminal o.

(C-2) Operation of Third Embodiment

Figure 13:
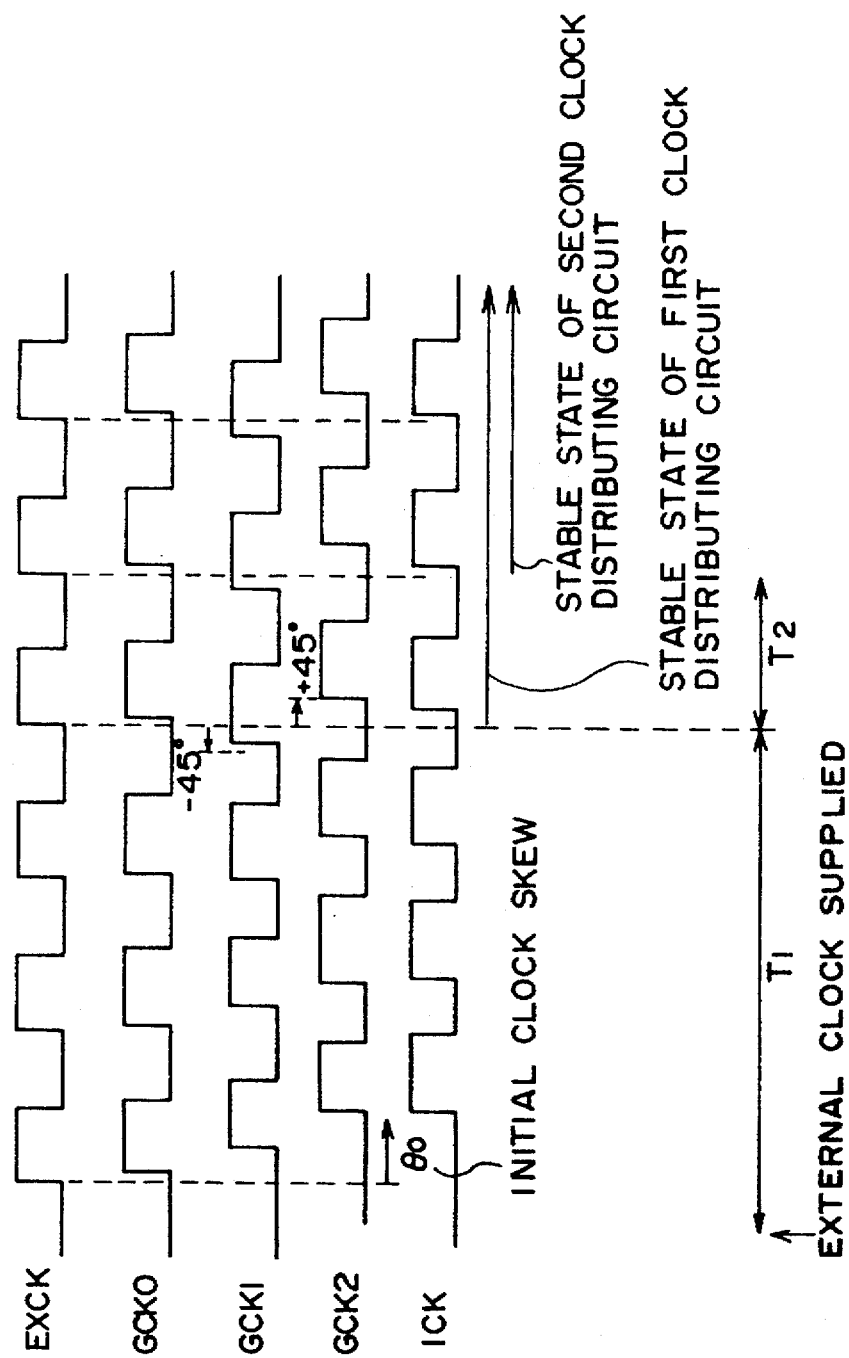
FIG. 13 is a schematic diagram showing wave forms of signals of the third embodiment.

FIG. 13 is a schematic diagram showing wave forms of clocks for explaining the operation of the third embodiment. When the external clock is supplied, the PLL circuit (composed of the PFDVC and the VCO) of the clock distribution output circuit CKSP 31 follows the external clock EXCK and locks the oscillation frequency of the VCO so that it accords with the frequency of the external clock.

On the other hand, the VCD of the clock distribution output circuit CKSP 31 is composed of the same delay cells as those of the VCO, the same DC control voltage as that supplied to the control terminal c of the VCO is supplied to the control terminal c. Thus, when the PLL circuit performs the locking operation, the phase shift amount of each delay cell of the VCD becomes stable with a predetermined amount. For example, when the VCO is composed of the same delay cells of four staged differential amplifying circuits, a clock with a phase shifted by 45° is obtained from each delay cell of the VCD. Thus, when an output signal is extracted from a predetermined stage of cascade connected delay cells of the VCD, a clock with a phase that has an advance by 45° against the external clock (this clock is the first global clock GCK1) and a clock with a phase that has a delay by 45° against the external clock (this clock is the second global clock GCK2) are obtained as shown in FIG. 13.

In the third embodiment, the cutoff frequencies of the low pass filters LPF 31 and LPF 32 of the PFDVC are varied. The feed-back clock of the PFDVC is treated as an output clock of the VCO. In addition, the output clock of the VCD in the follow-up state is treated as output clocks GCK1 and GCK2 of the circuit CKSP 31. Thus, the characteristics of which the PLL circuit has a faster follow-up speed than the DLL circuit can be effectively used. In addition, when the output clock of the PLL circuit is used as the output clock of the clock distribution output circuit CKSP 31, the jitter becomes large.

In FIG. 10, when buffer circuits BFF 30, BFF 31, and BFF 32 are disposed, the delay amounts thereof are much smaller than the time period equivalent to the phase 45° of the clock.

On the other hand, the distributed clock input circuits CKSP 321, CKSP 322, and so forth operate as follows.

In the distributed clock input circuits CKSP 321, CKSP 322, and so forth, the DLL circuit is composed of the PDVC and the PS. The DLL circuit removes the clock skew between the output clock ICK and the 0-th global clock GCK 0.

When the phase ICK of the output clock of the DLL circuit has an excessive advance against the phase of a 0-th global clock GCK0, the output voltage of the PDVC drops (rises). Thus, the weighting of the clock supplied from the input terminal i2 increases and thereby the wave form of the output clock of the PS becomes similar to the wave form of the clock supplied from the input terminal i2. Consequently, the excessive advance of the output clock supplied from the distributed clock input circuits CKSP 321, CKSP 322, and so forth is compensated.

On the other hand, when the phase of the output clock ICK supplied from the DLL circuit has an excessive delay against the phase of the 0-th global clock, the output voltage of the PDVC rises (or drops) and thereby the weighting of the clock supplied from the input terminal i1 (namely, the global clock GCK1 that has a phase with an advance) increases. Thereby, the wave form of the output clock supplied from the PS becomes similar to the wave form of the clock supplied from the input terminal i1. Thus, the excessive delay of the phase of the output clock supplied from the distributed clock input circuits CKSP 321, CKSP 322, and so forth is compensated.

As described above, the internal clocks ICK1, ICK2, and so forth distributed to the load circuits LD1, LD2, and so forth, respectively, are synchronized with the 0-th global clock GCK0 (thus, the external clock). Consequently, the skew between the external clock and the internal clock is removed.

Next, the stable time after the external clock is supplied until the internal clocks ICK1, ICK2, and so forth distributed to respective load circuits LD1, LD2, and so forth become stable will be described.

It takes a predetermined time period T1 after the external clock is supplied until the global clocks GCK1 and GCK2 become stable. However, the time period T1 is shorter than the follow-up time of the PLL circuit (composed of the PFDVC and the VCO) in the clock distribution output circuit CKSP 31. The PFDVC and the VCO in the clock distribution output circuit CKSP 31 are those of the PLL circuit as the feed-back clock. However, the PFDVC and the VCD can be treated as those of the DLL circuit. Thus, even if the PLL circuit does not completely follow the external clock, when the frequency difference between the external clock and the the clock supplied from the VCO becomes small (for example, the frequency difference becomes smaller than the cutoff frequency of the low pass filter LPF 32), the portion treated as the DLL circuit starts removing the phase difference. Even if the clock supplied from the PLL circuit has a jitter and has not completely followed the external clock, the global clocks GCK1 and GCK2 supplied from the VCD become stable (see the operation of the second embodiment).

In the DLL circuit composed of the PDVC and the PS of each of the distributed clock input circuits CKSP 321, CKSP 322, and so forth, the phase difference between each of the internal clocks ICK1, ICK2, and so forth of the load circuits LD1, LD2, and so forth and the external clock (the 0-th global clock GCK0) is removed within a time period T2 after the global clocks GCK1 and GCK2 become stable. In the DLL circuit, since a frequency error does not constantly take place between the input clock and the output clock, the time period T2 for which the DLL circuit removes the phase error is satisfactorily shorter than the follow-up time of the conventional PLL circuit.

Thus, the skew removing operation of the distributed clock input circuits CKSP 321, CKSP 322, and so forth are performed partially in parallel with the follow-up operation of the PLL circuit of the clock distribution output circuit CKSP 31. Thus, the stable time period (T1+T2) until each internal clock becomes stable is almost equal to or less than the follow-up time of the PLL circuit of the clock distribution output circuit CKSP 321.

(C-3) Effects of Third Embodiment

According to the third embodiment, the clock distributing circuit has the clock distribution output circuit that generates a first global clock that synchronizes with the external clock and that has a phase with an advance against the phase thereof and a second global clock that synchronizes with the external clock and that has a phase with a delay against the phase thereof. In addition, the clock distributing circuit according to the third embodiment has the distributed clock input circuit including the DLL circuit that supplies the internal clocks to the load circuits corresponding to the first global clock, the second global clock, and the external clock.

Thus, the clock distributing circuit according to the third embodiment has the following effects.

(1) Since the distributed clock input circuit disposed for each load circuit distributes and supplies an internal clock and removes a skew, the load of the clock distributing circuits is reduced. Thus, a clock with a high operating frequency can be supplied. Consequently, the clock skew can be quickly removed.

(2) The first global clock that has a phase with an advance against the phase of the external clock and a second global clock that has a phase with a delay against the phase of the external clock are supplied to the voltage control type phase shifter PS (with excellent voltage-phase conversion characteristics in linearlity) of the distributed clock input circuit. In addition, the phase shift amount of the voltage control type phase shifter is controlled with a control voltage corresponding to the phase difference between the external clock and the internal clock so as to generate the internal clock. Thus, the control voltage is suppressed from improperly varying and the jitter is reduced.

(3) The external clock is input to the PDVC of the distributed clock input circuit directly or through only a buffer means. In addition, the external clock is delayed with the control voltage generated by the PLL circuit of the clock distribution output circuit so as to generate the first and second global clocks. The first and second global clocks are supplied to the voltage control type phase shifter of the distributed clock input circuit. Thus, the follow-up operation of the PLL circuit of the clock distribution output circuit and the clock skew removing operation of the distributed clock input circuit are performed partially in parallel. Consequently, the stable time after the external clock is supplied until the clock supplied to the system becomes stable becomes short.

(D) Fourth Embodiment

Next, with reference to the accompanying drawings, a fourth embodiment of the present invention will be described.

(D-1) Structure of Fourth Embodiment

FIG. 14 is a block diagram showing a structure of a clock distributing circuit according to a fourth embodiment of the present invention.

In FIG. 14, the clock distributing circuit according to the fourth embodiment comprises a plurality of PLL circuits CKSP 41, CKSP 42, CKSP 43, and so forth. Each of the PLL circuits CKSp 41, CKSP 42, CKSP 43, and so forth is composed of a PFDVC and a VCO having two control terminals.

The PFDVC of each of the PLL circuits CKSP 41, CKSP 42, CKSP 43, and so forth has the structure shown in FIG. 11.

Figure 15:
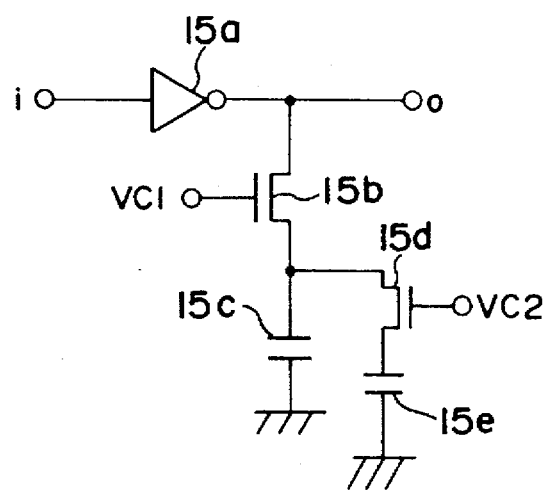
FIG. 15 is a schematic diagram showing a circuit of a delay cell of a voltage control type oscillating circuit of the fourth embodiment.

Each of the VCO 40, VCO 41, VCO 42, and so forth is composed of a plurality of delay cells DLC2 connected in a ring shape as shown in FIG. 7. Each of the delay cells DLC2 has two control terminals VC1 and VC2 for controlling a delay time as shown in FIG. 15. Each of the delay cells DLC2 is composed of an inverter 15a, an NMOS transistor 15b, a condenser 15c, an NMOS transistor 15d, and a condenser 15e. The NMOS transistor 15b and the condenser 15c are connected in series between the output terminal of the inverter 15a and the ground. The NMOS transistor 15d and the condenser 15e are connected in series between the connected point of the NMOS transistor 15b and the condenser 15c and the ground. When the control voltage VC1 or VC2 varies, the time constant of a charging/discharging circuit composed of the NMOS transistor 15b, the condenser 15c, the NMOS transistor 15d, and the condenser 15e varies. Thus, the output variation speed of the inverter 15a varies.

Returning to FIG. 14, in each of the PLL circuits CKSP 41, CKSP 42, CKSP 43, and so forth, a first input terminal i1 of the PFDVC is connected to an external clock input terminal EXCK. A second input terminal i2 of the PFDVC is connected to output clock lines ICK1, ICK2, and so forth of the PLL circuit.

In an N-th PLL circuit (for example, the CKSP 41), a first output terminal o1 of the PFDVC is connected to a second control terminal VC2 of the VCO (for example, VCO 40) of the PLL circuit. A second output terminal o2 is connected to a first control terminal VC1 of the VCO (for example, VCO 41) of an (N+1)th PLL circuit (for example, the CKSP 42).

(D-2) Operation of Fourth Embodiment

Figure 16:
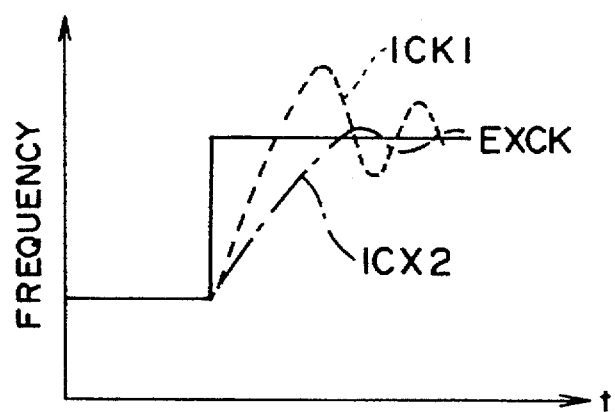
FIG. 16 is a chart showing frequency characteristics of clocks of the fourth embodiment.

FIG. 16 is a chart showing frequency responses of internal clocks ICK1 and ICK2 that are outputs of each PLL circuit corresponding to the frequency variation of the external clock EXCK according to the fourth embodiment.

When the external clock EXCK varies, the first staged PLL circuit CKSP 41 performs the follow-up operation for the variation of the external clock EXCK. When the follow-up operation progresses to some extent and the frequency difference between the external clock EXCK and the internal clock ICK1 supplied from the VCO 40 becomes small, the voltage of the output terminal o2 of the PFDVC of the PLL circuit CKSP 41 becomes stable. Thus, the second staged PLL circuit CKSP 42 substantially follows the follow-up operation.

As described above, the output terminal o2 of the PFDVC is connected to a low pass filter with a larger time constant than that of the output terminal o1 of the PFDVC. Thus, when the follow-up operation is performed, the noise of the voltage VCout of the output terminal o2 of the PFDVC can be remarkably reduced without a tradeoff of a high speed response of the PLL loop composed of the PFDVC and the VCO 40.

The oscillation frequency of the VCO 41 of the second staged PLL circuit CKSP 42 almost depends on the voltage VCout. A small frequency/phase difference between the output clock ICK2 of the PLL circuit CKSP 42 and the external clock EXCK is removed by the CKSP 42 of the PLL circuit.

As shown in FIG. 16, when the second staged PLL circuit CKSP 42 performs the follow-up operation for the output clock ICK2, the variation of the frequencyphase is smaller than that of the first staged output clock ICK1. This applies to the jitter. In addition, the circuit operation after the second stage is the same.

(D-3) Effects of Fourth Embodiment

According to the fourth embodiment, an internal clock that results in a large jitter, but that quickly responds to the variation of the frequency/phase of the external clock and an internal clock that does not quickly respond to the external clock, but that results in a small jitter can be obtained. Thus, a proper clock corresponding to various load circuits can be distributed and supplied.

In addition, the follow-up operation of an (N+1)th staged PLL circuit is substantially started when the frequency difference as the result of the follow-up operation of the N-th staged PLL circuit is small. Thus, the follow-up operations of the PLL circuits are performed partially in parallel. Consequently, the follow-up operation is quickly performed in the entire system.

(E) Fifth Embodiment

Next, with reference to the accompanying drawings, a clock distributing circuit according to a fifth embodiment of the present invention will be described.

(E-1) Structure of Fifth Embodiment

Figure 17:
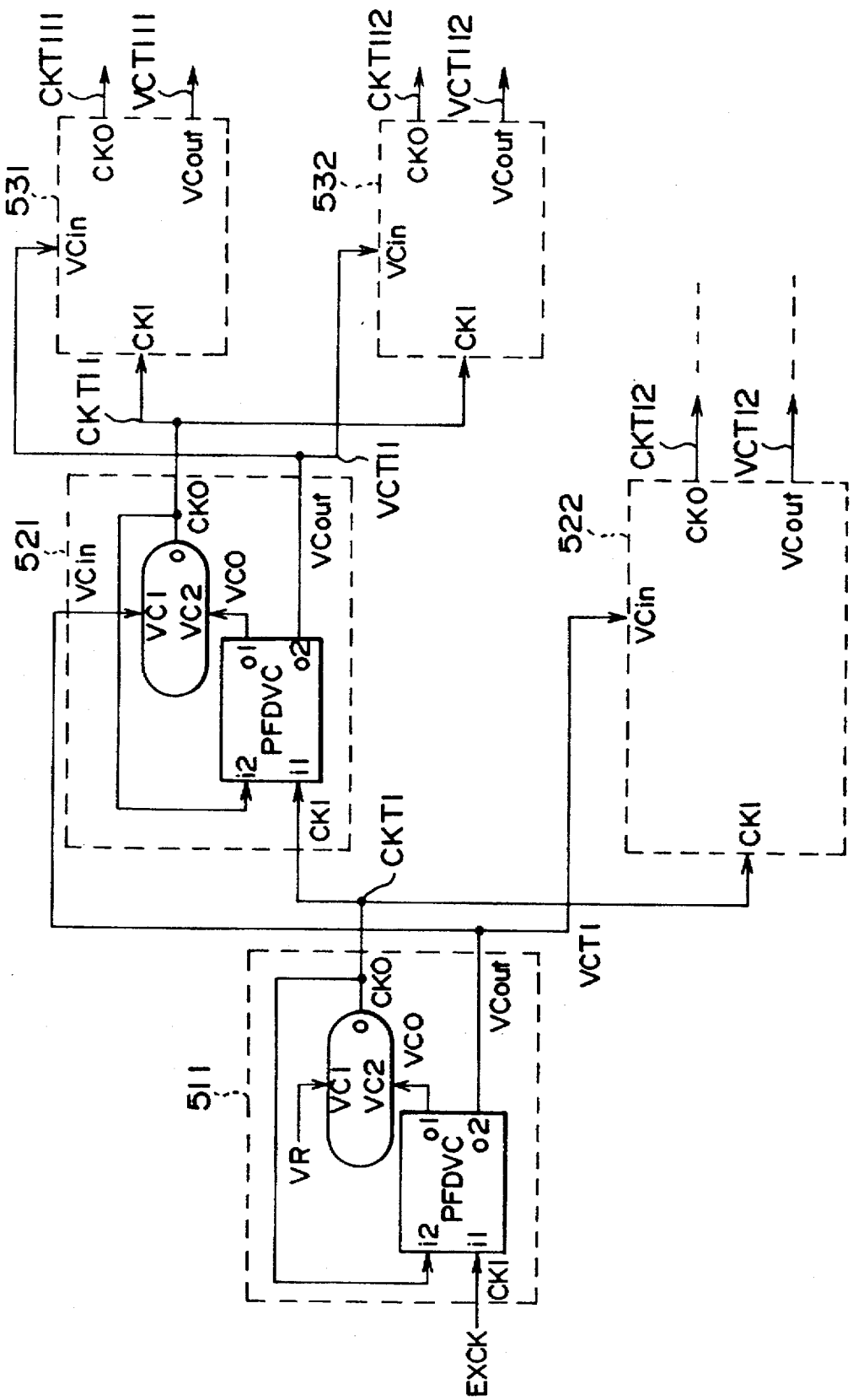
FIG. 17 is a block diagram showing a structure of a fifth embodiment.

FIG. 17 is a block diagram showing a structure of a clock distributing circuit according to a fifth embodiment of the present invention.

In FIG. 17, the clock distributing circuit according to the fifth embodiment comprises a plurality of PLL circuits 511, 521, 522, 531, 532, and so forth that are connected in a tree shape. Each of the PLL circuits is composed of a PFDVC and a VCO. The connections of the PFDVC and the VCO of the fifth embodiment are the same as those of the fourth embodiment. The structures of the PFDVC and the VCO of the fifth embodiments are the same as those of the fourth embodiment.

In the fifth embodiment, a clock output terminal CKO of a PLL circuit (for example, 511) of an N-th staged branch is connected to a clock input terminal CKI of each PLL circuit (for example, 521 and 522) included in the (N+1)th staged branch. In addition, an output voltage (VCout) of a second output terminal o2 of the PFDVC of any PLL circuit (for example, 511) of the N-th staged branch is supplied to a first control terminal VC1 of each VCO of all or part of PLL circuit (for example, 521 and 522) of the (N+1)th staged branch.

(E-2) Operation of Fifth Embodiment

In the fifth embodiment, the follow-up operations are successively performed by the PLL circuits on the preceding stages for variations of frequency/phase of the external clock EXCK. At this point, as with the fourth embodiment, a first control voltage terminal VC1 of the VCO of the PLL circuit at the second or later stage coarsely outputs a predetermined voltage corresponding to the frequency of the external clock EXCK. The PLL circuit only adjusts a small phase/frequency error between the input clock and the output clock. Thus, the follow-up operation can be quickly performed and the jitter can be reduced.

The small phase/frequency difference of the (N+1)th staged PLL circuit can be removed even if the follow-up operation of the N-th staged PLL circuit is not completely performed. In addition, in the fifth embodiment, since the PLL circuits are connected in the tree shape, the loads of the PLL circuits are equally decreased. Thus, the clock distributing circuit can quickly perform the follow-up operation at a high frequency.

(E-3) Effects of Fifth Embodiment

As described above, according to the fifth embodiment, the PLL circuits are connected in the tree shape. In addition, the clock output of the PLL circuit on the preceding stage and the control voltage locked with the input clock corresponding to the VCO control voltage are supplied to the PLL circuit on the next stage. Thus, the clock distributing circuit according to the fifth embodiment has the following effects.

(1) The loads of the PLL circuits can be equally reduced. Thus, the clock distributing system can be operated at a high frequency.

(2) Each staged PLL circuit removes a large frequency error with the control voltage supplied from the preceding stage. Thus, according to the fifth embodiment, the follow-up operation can be performed more quickly than the conventional multiple cascade structure of which the clock inputs and the clock outputs of the PLL circuits are connected each other. In addition, the jitter can be more reduced than the conventional structure.

(F) Other Embodiments (1) According to the clock distributing circuit of the present invention, the circuit is divided into a plurality of portions. A clock with a high frequency and a small jitter is supplied as an external clock to each portion. The external clock is quickly distributed to each portion. Thus, the clock distributing circuit according to the present invention can be effectively used for a semiconductor circuit integrated on a large area chip, a system board, a SIM, or DIM on which a large number of semiconductor circuits are disposed, and a multi-chip module (MCM).

(2) The clock line used in each embodiment can be substituted with a complementary clock line that transmits complementary clock pulses. In this case, as with an ECL, a pair of complementary pulses are input and a pair of complementary pulses are output. In addition, the present invention can be applied for distributing pulses with a duty ratio of 50% as well as clock pulses.

The term "clock" in "what is claimed is" of the present patent application includes the meaning of single and complementary clocks. In addition, the application of pulses includes the meaning of pulses other than clock pulses.

(3) If necessary, a frequency dividing circuit may be disposed in the PLL circuit according to the second embodiment to the fifth embodiment so that the clock distributing circuit operates with a frequency synthesizer.

(4) It should be noted that the PFDVC, PDVC, VCO, and VCD are not limited to the structures described in the above-described first to fifth embodiments. For example, the PFDVC may be composed of an F-V converter with an integrating circuit or composed of an up-down counter and a D/A converter. In addition, the PDVC may be composed of an analog multiplying circuit.

(5) In the third to fifth embodiments, a structure for outputting two same control voltages may be used instead of the PFDVC for outputting two types of control voltages.

(6) In the fourth and fifth embodiments, a DLL circuit with a VCD having two control voltage input terminals may be used instead of the PLL circuit.

According to the present invention, the clock synchronizing circuits that receive control voltages are disposed in a hierarchical shape or a tree shape. The internal structures of the clock synchronizing circuits vary in the hierarchical structure. A control voltage corresponding to the phase difference or the frequency difference in a particular clock synchronizing circuit is supplied to both the local clock synchronizing circuit and another clock synchronizing circuit disposed in a later stage thereof. Thus, the output clock is coarsely controlled by the clock synchronizing circuit disposed on the preceding stage (including the clock distribution output circuit) so that the output clock synchronizes with the external clock. The frequency difference and the phase difference against the external clock are removed by the clock synchronizing circuit disposed on the later stage (including the distributed clock input circuit). Thus, the skew difference removed by each circuit is decreased. Consequently, the jitter is decreased. In addition to the decrease of the skew removing time, the operation is performed partially in parallel with the follow-up operation of the circuit disposed on the preceding stage thereof. Thus, the system startup time can be reduced in comparison with the conventional structure of which PLL circuits are multiply staged. In addition, the load of each circuit is reduced. A clock with a higher frequency can be distributed. Thus, the clock stable time of each load circuit becomes short.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A clock distributing circuit, comprising: a clock distribution output circuit having a voltage control type delay circuit and a phase difference-voltage converting circuit, wherein the voltage control type delay circuit is for delaying a first clock in response to a first control voltage and for outputting a second clock obtained by delaying the first clock, and wherein the phase difference-voltage converting circuit is for converting a phase difference between the first clock and the second clock into the first control voltage; and a plurality of distributed clock input circuits coupled to the voltage control type delay circuit, each of the distributed clock input circuits having a voltage control type oscillator and a phase/frequency difference-voltage converting circuit, wherein the voltage control type oscillator is for varying a frequency and a phase of a third clock output therefrom in response to a second control voltage, and wherein the phase/frequency difference-voltage converting circuit is for converting a phase/frequency difference between the second clock and the third clock into the second control voltage.

2. A clock distributing circuit, comprising:

a clock distribution output circuit having a voltage control type oscillator and a phase/frequency difference-voltage converting circuit, wherein the phase/frequency difference-voltage converting circuit is for converting a phase/frequency difference between a first clock and a second clock into a first control voltage, and wherein the voltage control type oscillator is for varying a frequency and a phase of the second clock output therefrom in response to the first control voltage;

a plurality of distributed clock input circuits coupled to the voltage control type oscillator, each of the distributed clock input circuits having a voltage control type delay circuit and a phase difference-voltage converting circuit, wherein the voltage control type delay circuit is for delaying the second clock in response to a second control voltage and for outputting a third clock obtained by delaying the second clock, and wherein the phase difference-voltage converting circuit is for converting a phase difference between the second clock and the third clock into the second control voltage.

3. A clock distributing circuit, comprising:

a clock distribution output circuit having a voltage control type oscillator, a voltage control type delay circuit and a phase/frequency difference-voltage converting circuit, wherein the voltage control type oscillator is for varying a frequency and a phase of a clock output therefrom in response to a first control voltage, wherein the voltage control type delay circuit is for delaying a first clock in response to a second control voltage and for outputting a second clock and a third clock, the second clock having a phase with an advance relative to a phase of the first clock, the third clock having a phase with a delay relative to the phase of the first clock, and wherein the phase/frequency difference-voltage converting circuit is for converting a phase/frequency difference between the first clock and the clock output from the voltage control type oscillator into the first control voltage and the second control voltage; and a plurality of distributed clock input circuits coupled to the voltage control type delay circuit, each of the distributed clock input circuits having a phase difference-voltage converting circuit for converting a phase difference between the first clock and a fourth clock into a third control voltage, the voltage control type phase shifter for generating the fourth clock in response to the second and third clock, and the third control voltage.

4. A clock distributing circuit comprising:

a first clock synchronizing circuit having a first voltage control type oscillator and a first phase/frequency difference-voltage converting circuit, wherein the first voltage control type oscillator is for varying a frequency and a phase of a clock output therefrom in response to a reference voltage and a first control voltage, and wherein the first phase/frequency difference-voltage converting circuit is for converting a first phase/frequency difference between a first clock and the clock output from the first voltage control type oscillator into the first control voltage and a second control voltage; and a second clock synchronizing circuit having a second voltage control type oscillator and a second phase/frequency difference-voltage converting circuit, wherein the second voltage control type oscillator is for varying a frequency and a phase of a clock output therefrom in response to the second control voltage and a third control voltage, and wherein the second phase/frequency difference-voltage converting circuit is for converting a phase/frequency difference between the first clock and the clock output from the second voltage control type oscillator into the third control voltage and a fourth control voltage.

5. A clock distributing circuit comprising:

a first clock synchronizing circuit having a first voltage control type delay circuit and a first phase difference-voltage converting circuit, wherein the first voltage control type delay circuit is for delaying a first clock in response to a reference voltage and a first control voltage and for outputting a second clock obtained by delaying the first clock, and wherein the first phase difference-voltage converting circuit is for converting a phase difference between the first clock and the second clock into the first control voltage and a second control voltage; and a second clock synchronizing circuit having a second voltage control type delay circuit and a second phase difference-voltage converting circuit, wherein the second voltage control type delay circuit is for delaying a first clock in response to the second control voltage and a third control voltage and for outputting a third clock obtained by delaying the first clock, and wherein the second phase difference-voltage converting circuit is for converting a phase difference between the first clock and the third clock into the third control voltage.

6. A clock distributing circuit comprising:

a first clock synchronizing circuit having a first voltage control type oscillator and a first phase/frequency difference-voltage converting circuit, wherein the first voltage control type oscillator is for varying a frequency and a phase of a clock output therefrom in response to a reference voltage and a first control voltage, and wherein the first phase/frequency difference-voltage converting circuit is for converting a phase/frequency difference between the first clock and the clock output from the first voltage control type oscillator into the first control voltage and a second control voltage; and a plurality of second clock synchronizing circuits coupled to the first clock synchronizing circuit, each of the second clock synchronizing circuits having a second voltage control type oscillator and a second phase/frequency difference-voltage converting circuit, wherein the second voltage control type oscillator is for varying a frequency and a phase of a clock output therefrom in response to the second control voltage and a third control voltage, and wherein the second phase/frequency difference-voltage converting circuit is for converting a phase/frequency difference between the clock output from the first voltage control type oscillator and the clock output from the second voltage control type oscillator into the third control voltage and a fourth control voltage.

7. A clock distributing circuit comprising:

a first clock synchronizing circuit having a first voltage control type delay circuit and a first phase difference-voltage converting circuit, wherein the first voltage control type delay circuit is for delaying a first clock in response to a reference voltage and a first control voltage and for outputting a second clock obtained by delaying the first clock, and wherein the first phase difference-voltage converting circuit is for converting a phase difference between the first clock and the second clock into the first control voltage and a second control voltage; and a plurality of second clock synchronizing circuits coupled to the first clock synchronizing circuit, each of the second clock synchronizing circuits having a second voltage control type delay circuit and a second phase difference-voltage converting circuit, wherein the second voltage control type delay circuit is for delaying a second clock in response to a third control voltage and second control voltage and for outputting a third clock obtained by delaying the second clock, and wherein the second phase difference-voltage converting circuit is for converting a phase difference between the second clock and the third clock into the third control voltage.

* * * * *